United States Patent
Feeney

(10) Patent No.: US 8,287,266 B2
(45) Date of Patent: Oct. 16, 2012

(54) DEVICE FOR PERFORMING CONSOLIDATION AND METHOD OF USE THEREOF

(75) Inventor: Christopher John Feeney, Wallingford, CT (US)

(73) Assignee: GKN Aerospace Services Structures, Corp., Cromwell, CT (US)

( * ) Notice: Subject to any disclaimer, the term of this patent is extended or adjusted under 35 U.S.C. 154(b) by 880 days.

(21) Appl. No.: 11/808,925

(22) Filed: Jun. 13, 2007

(65) Prior Publication Data

US 2008/0078499 A1   Apr. 3, 2008

Related U.S. Application Data

(60) Provisional application No. 60/814,075, filed on Jun. 16, 2006.

(51) Int. Cl.
*B32B 37/10* (2006.01)
*B65H 81/00* (2006.01)

(52) U.S. Cl. .............. 425/338; 425/364 R; 425/373; 425/393; 425/403; 425/405.1; 425/818; 425/339; 425/389; 156/288; 156/430; 156/444; 156/454; 156/496; 156/580; 156/583.5

(58) Field of Classification Search .......... 425/364 R, 425/371, 387.1, 388, 393, 403, 405.1, 466, 425/471, 818, DIG. 106, DIG. 112, 338–339, 425/520, 394, 389, 373; 249/65; 156/222, 156/443, 444, 484, 494, 555, 580, 582, 583.1, 156/583.3, 583.5, 156–158, 160, 161, 163, 156/164, 285, 288, 496, 169, 173, 189, 191, 446, 175, 425, 428–430, 454–455; 242/437.4, 242/438.1, 439.1, 615.1; 100/151; 198/844.2
See application file for complete search history.

(56) References Cited

U.S. PATENT DOCUMENTS

| | | | | |
|---|---|---|---|---|
| 2,412,274 A | * | 12/1946 | Kloote | 156/391 |
| 2,702,406 A | * | 2/1955 | Reed | 26/72 |
| 3,494,118 A | | 2/1970 | Bobkowicz et al. | |
| 3,570,085 A | * | 3/1971 | Heinemann | 28/112 |
| 3,580,795 A | * | 5/1971 | Eichenlaub | 156/583.3 |
| 3,602,946 A | * | 9/1971 | Curetti et al. | 425/185 |
| 3,737,757 A | | 6/1973 | Fowler et al. | |
| 3,783,097 A | * | 1/1974 | Justus | 162/358.3 |
| 3,844,097 A | | 10/1974 | Bobkowicz et al. | |
| 3,923,583 A | * | 12/1975 | Bianchini | 156/378 |
| 3,969,051 A | * | 7/1976 | Hovila | 425/11 |
| 4,058,424 A | * | 11/1977 | Breher | 156/137 |
| 4,452,597 A | * | 6/1984 | Achelpohl | 493/204 |
| 4,522,676 A | * | 6/1985 | Masao | 156/443 |
| 4,551,965 A | * | 11/1985 | Prottengeier | 53/463 |
| 4,744,935 A | | 5/1988 | Priaroggia et al. | |

(Continued)

FOREIGN PATENT DOCUMENTS

JP     01082937 A  *  3/1989

*Primary Examiner* — Dimple Bodawala
(74) *Attorney, Agent, or Firm* — Quarles & Brady LLP

(57) ABSTRACT

A preforming device and method of use thereof, the device including a rack, a pinion, belt, belt tensioning feature, and mechanism for supporting a variably appliable enhanced pressure, such as may be applied using a bladder or bladders having one or more valves, the device capable of engaging a mandrel to form at least one ply and a binder against the exterior of the mandrel.

17 Claims, 6 Drawing Sheets

U.S. PATENT DOCUMENTS

| | | | |
|---|---|---|---|
| 4,756,170 A * | 7/1988 | Gibson et al. | 68/200 |
| 4,826,555 A * | 5/1989 | Long | 156/324 |
| 4,885,317 A * | 12/1989 | Thein et al. | 521/149 |
| 4,901,589 A | 2/1990 | Gaigl | |
| 4,992,133 A * | 2/1991 | Border | 156/498 |
| 5,021,115 A | 6/1991 | Tokita | |
| 5,082,255 A * | 1/1992 | Brigante et al. | 270/45 |
| 5,149,394 A * | 9/1992 | Held | 156/555 |
| 5,192,390 A * | 3/1993 | Perkins | 156/425 |
| 5,320,036 A * | 6/1994 | Krohn et al. | 100/154 |
| 5,395,232 A | 3/1995 | Hori | |
| 5,463,946 A * | 11/1995 | Kruger et al. | 100/314 |
| 5,527,422 A * | 6/1996 | Lehmann et al. | 156/555 |
| 5,538,676 A * | 7/1996 | Bielfeldt | 264/109 |
| 5,665,191 A * | 9/1997 | Johansson et al. | 156/161 |
| 5,672,234 A * | 9/1997 | Rodenstein et al. | 156/494 |
| 5,711,214 A * | 1/1998 | Lauderbaugh et al. | 100/48 |
| 5,874,152 A * | 2/1999 | Middelman | 428/105 |
| 5,909,895 A * | 6/1999 | Iino et al. | 280/743.1 |
| 6,036,909 A * | 3/2000 | Baum | 264/280 |
| 6,126,789 A * | 10/2000 | Schiel et al. | 162/358.3 |
| 6,153,048 A * | 11/2000 | Abramson et al. | 156/555 |
| RE37,242 E * | 6/2001 | Hadzicki et al. | 156/446 |
| 6,557,608 B2 * | 5/2003 | Bartlett et al. | 156/502 |
| 6,609,674 B2 | 8/2003 | Gabrys | |
| 6,648,044 B2 * | 11/2003 | Bohn et al. | 156/515 |
| 6,701,990 B1 * | 3/2004 | Burley et al. | 156/463 |
| RE38,552 E * | 7/2004 | Hadzicki et al. | 156/446 |
| 6,827,803 B1 * | 12/2004 | Willis | 156/157 |
| 6,942,751 B1 * | 9/2005 | George | 156/286 |
| 7,427,372 B2 * | 9/2008 | Morita | 264/210.2 |
| 7,566,374 B2 * | 7/2009 | Brazier et al. | 156/62.2 |
| 2004/0219246 A1 * | 11/2004 | Jeans | 425/174.4 |
| 2005/0145322 A1 | 7/2005 | Hoffman et al. | |
| 2005/0233881 A1 * | 10/2005 | Meyer | 493/405 |
| 2006/0060325 A1 | 3/2006 | Gordon et al. | |

* cited by examiner

DEVICE FOR PERFORMING CONSOLIDATION AND METHOD OF USE THEREOF

This application is based upon and claims the benefit of priority from the prior U.S. Provisional Application No. 60/814,075 filed on Jun. 16, 2006, the entire contents of which are incorporated herein by reference.

BACKGROUND OF THE INVENTION

1. Field of the Invention

The present invention relates to a device that simultaneously shapes and consolidates multiple plies of composite fabrics or other material to be formed or preformed, while maintaining fiber orientation and registration of the ply surface.

2. Background of the Related Art

There is a general need in the art of preforming to have multiple plies or other similar materials accurately indexed with no ply distortion in a complex geometry.

In the prior art, individuals would lay-up each ply on a mold, attempting to eliminate distortion by hand, while working out wrinkles as best as possible. Quality depends on the operator and is limited, for example, by finger pressure applied. Among other things, problems exist with operator variation and capabilities to eliminate distortion, as well as the cost in time spent manually laying up individual plies, while maintaining proper orientation.

SUMMARY OF THE INVENTION

The present invention overcomes the above identified problems, as well as others, by providing a device and method for providing uniform consolidation and orientation of a complete ply pack or other material to be formed or preformed.

Among other advantages, the present invention allows the forming or preforming to be accomplished in much less time than prior art systems. In addition, the ply orientation, consolidation, and non-distortion are consistently repeatable with the present invention.

The preforming device of one exemplary embodiment of the present invention includes a rack, a pinion, belt, belt tensioning feature, and mechanism for supporting a variably appliable enhanced pressure, such as may be applied using a bladder or bladders having one or more valves. In this exemplary embodiment, the rack portion has edges for engaging the edges of the mandrel section. As the pinion is activated, it places the leading edge of the mandrel engages the belt and the material to be formed placed on the belt. The rack continues application of a force of the mandrel against the belt. Due to the elasticity of the belt, the belt generally conforms to the shape of the mandrel. This part of the process forces the materials against the mandrel, eliminating or greatly reducing the possibility of distortion, wrinkles and improper indexing of the material being shaped.

Upon the mandrel being driven by the rack and pinion to a predetermined stop position, the mechanisms for supporting a variably appliable enhanced pressure against the sides of the mandrel are activated (e.g., via valves). This operation completes the preforming consolidation of the material, accurately and with concise positioning.

In one exemplary embodiment, the rack and pinion portions have generally linear shaped teeth and drive the mandrel with a downward force to engage the mandrel with the elastic belt, which is tensioned by a weight so as to accurately apply force against the material to be preformed.

Reversal of the rack and pinion operation then removes the preformed material consolidated onto the mandrel from engagement with the belt.

Another exemplary embodiment includes a device for performing consolidation, the device comprising a rack; at least two rollers, wherein the at least two rollers include a pair of extensions extending from ends of the rollers, and wherein the extensions are slidable in slots in retainers for the rollers; a belt surrounding the at least two rollers; a weight, wherein the belt serpentines around the at least two rollers and the weight, such that the at least two rollers are biased toward each other; a mandrel having an axial direction and engageable with the rack: a material to be consolidated being applied to the surface of the belt facing a leading edge of the mandrel; and a mandrel engaging mechanism; wherein the mandrel engaging mechanism is capable of driving the mandrel in a direction parallel to the axial direction of the mandrel and generally perpendicularly to a surface of the belt from a first position to second position; wherein two parallel wall portions are located on opposite sides of the mandrel when the mandrel is driven into the belt to the second position; wherein an inflatable bladder is located on at least one of the parallel wall portions; and wherein each inflatable bladder is capable of compressing against a side of the mandrel.

Another exemplary embodiment includes an apparatus for uniformly consolidating and orienting a material to be formed, the apparatus comprising a rack, at least two rollers; a belt surrounding the at least two rollers; a tensioning feature; and a mandrel having an axial direction, the material to be formed applied to a surface of the belt, wherein the rack is capable of engaging the mandrel and driving the mandrel in a direction parallel to the axial direction of the mandrel and generally perpendicularly to a surface of the belt.

The material may a composite material. The apparatus may further include a pinion that engages the mandrel to drive the mandrel into the belt. The rack and pinion may include teeth that engage the mandrel.

The apparatus may further include a mechanism for applying a variably enhanced pressure to the mandrel. The mechanism for applying a variably enhanced pressure may include parallel wall portions located on opposite sides of the mandrel when the mandrel is driven into the belt. The opposing parallel wall portions may include at least one inflatable bladder.

The tensioning feature of the apparatus may include at least one selected from a group consisting of a weight, a biasing mechanism, and an electromagnetically controlled roller. The biasing mechanism may be a spring. The tensioning feature may include a cylindrical weight, wherein the belt wraps around the cylindrical weight.

The rollers may include a pair of extensions extending from ends of the roller, and wherein the extensions are inserted slidably in slots in retainers for the rollers. The apparatus may further include a biasing mechanism for biasing the at least two rollers toward each other.

Another exemplary embodiment of the invention includes method of shaping and consolidating multiple plies of a material, the method comprising locating at least one ply of a material with an applied binder on a surface of the belt; engaging a mandrel in a rack of a performing apparatus at a first position, wherein the performing apparatus comprises at least two rollers; a belt surrounding the at least two rollers; and a tensioning feature; and driving the mandrel perpendicularly to the surface of the belt with the applied material to a second position.

The method may further include providing additional material with the at least one ply and binder, wherein the additional material includes at least one selected from a group consisting of a sensor, a heater component, and a buffer layer.

The method may further include tensioning the at least two rollers, such that a minimal distance is maintained between the rollers before the mandrel is driven into the belt and the material, driving the mandrel perpendicularly into the belt and the material, such that the rollers are driven apart from one another, or applying a generally even pressure to the leading edge of the mandrel.

The method may include maintaining at least one element of the rack at a predetermined, uniform temperature, wherein the predetermined temperature is a raised temperature above ambient and, wherein the at least one element is selected from a group consisting of the belt, the at least one of the rollers, and the mandrel.

The method may include compressing the side portions of the mandrel by engaging an enhanced pressure mechanism when the mandrel is in the second position, wherein engaging the enhanced pressure mechanism includes inflating a bladder on at least one of a pair of parallel walls on opposite sides of the mandrel when the mandrel is in the second position.

The method may include maintaining the enhanced pressure for a predetermined period of time, such that the at least one ply and binder set or determining the thickness of the ply and binder based on the tension applied by the tensioning feature and the compression applied by the enhanced pressure mechanism.

Another exemplary embodiment includes a device for performing consolidation, the device comprising means for engaging a mandrel, having an axial direction, means for positioning a material to be formed with a surface perpendicular to the axial direction of the mandrel; pressure means for applying a generally uniform enveloping pressure to a surface of the mandrel with the material to be formed applied; driving means for driving the mandrel into the pressure means and into the surface of the material; and compression means for applying a variably enhanced pressure to sides of the mandrel when the mandrel is driven into the pressure means.

Additional advantages and novel features of the invention will be set forth in part in the description that follows, and in part will become more apparent to those skilled in the art upon examination of the following or upon learning by practice of the invention.

DESCRIPTION OF THE INVENTION

Figure 1:
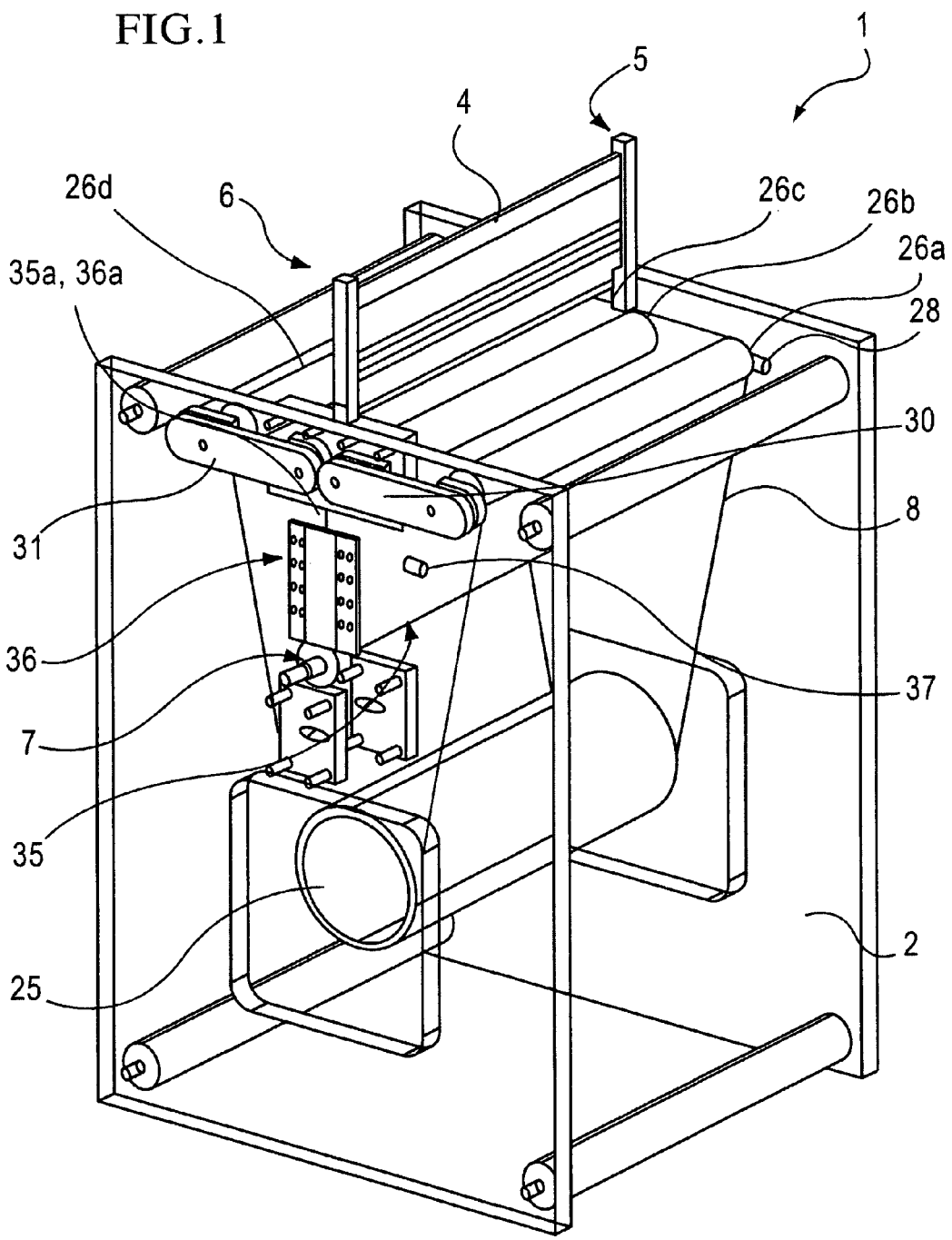
FIG. 1 is a perspective view of an exemplary preforming machine having a belt with a rack and pinion, in accordance with one embodiment of the present invention.

FIG. 1 shows a perspective view of an exemplary preforming machine 1 having a housing 2 for producing a composite material containing multiple fiber plies or other similarly formable materials (also interchangeably referred to herein as "the laminate" or "the composite material"). A mandrel 4 serves as a first component in a tool string for creating the composite material. The tool string, as used herein, refers to the tools used in conjunction with the preforming machine 1 to create a part (e.g., a composite part made from the laminate, such as an aircraft part).

Figure 3:
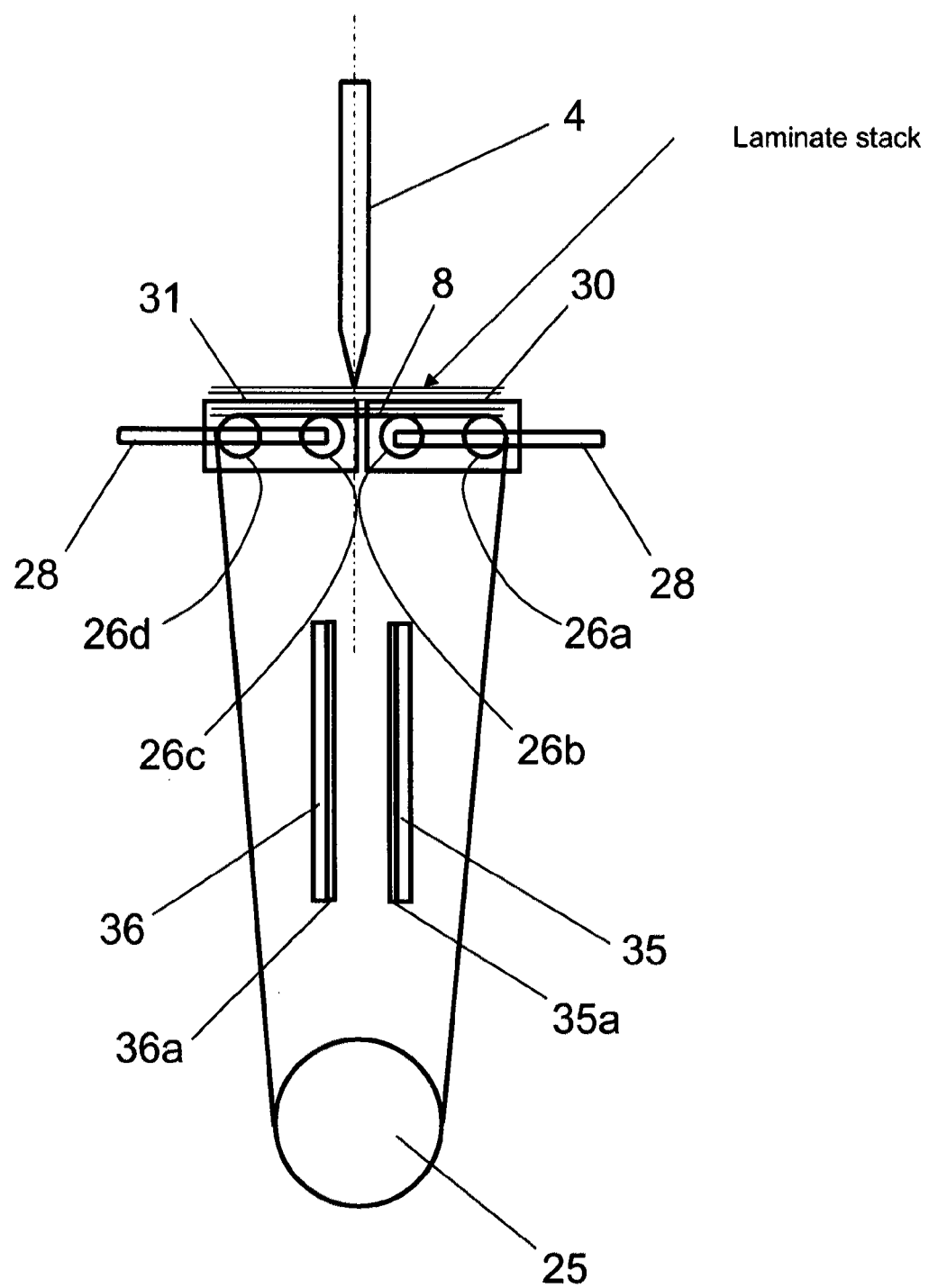
FIG. 3 presents a side view of an embodiment of the present invention with layers of material to be formed.

A belt 8, such as a fabric belt, contacts two or more rollers held by end retainers 30, 31. Belt 8 also supports weight or other tensioning feature 25. The material to be formed is positioned on a surface of the belt 8 (as shown in FIG. 3). In the embodiment shown in FIG. 1, after applying a material to be formed onto a surface of the belt 8, the mandrel 4 is inserted into slots 5 in a rack 6, which allows the mandrel 4 to be driven, for example, via a pinion 7 attached to (e.g., circumferentially frictionally fitting upon) a shaft.

The rack 6 is positioned such that the mandrel 4 engaged thereby is able to engage the belt 8 upon being driven downward, as shown in FIG. 1. Thus, the mandrel is driven by a mandrel engaging mechanism engageable with the mandrel. As shown in FIG. 1, the rack 6 includes two rectilinear components engaging outside edges of the mandrel 4. Gears within the rack 6 are driven via a shaft (e.g., pinion 7) to which a hand crank or other driving device is attachable.

Upon turning of the pinion 7, gear mechanisms (e.g., gears and/or gear driven chain links) in or operating in conjunction with rack 6 (e.g., within slots 5) engage engagement features (e.g., gear engaging openings or teeth) located at or near each end of the mandrel 4. Engagement of rack 6 and mandrel 4 causes travel of mandrel 4 downward, as shown in FIG. 1, such that lower end of mandrel 4, as shown in FIG. 1, is driven generally perpendicularly into the belt 8 with emplaced plies and buffering layer.

In one embodiment, two sets of pinions 7, gear mechanisms, and engagement features are used, the two pinions 7 being located at ends of a shaft. The ends of the mandrel 4 are thus cooperatively driven in tandem within the slots 5, such that the mandrel progresses generally evenly throughout its length along a leading edge (lower edge, as shown in FIG. 1) against the belt 8

The belt 8, which is of a predetermined length, is tensioned by a tensioning feature 25. For example, as shown in FIG. 1, the belt 8 serpentines about a weight (e.g., a roller), and two or more rollers 26a, 26b, 26c, 16d. In other embodiments, other features are usable to tension the belt. These features may include biasing mechanisms such as spring or resistance features secured to the belt, or other tensioning features, such as electro-magnetically controlled rollers.

In one embodiment, one or more of the rollers 26a, 26b, 26c, 26d have extensions (e.g., pins) extending from both ends, allowing the rollers to slide via the extensions within slots 28. In some embodiments, the rollers are grouped in pairs 26a, 26b and 26c, 26d, the pairs being coupled via the extensions of the rollers 26a, 26b, 26c, 26d engaging end retainers 30, 31, respectively.

The paired rollers 26a, 26b and 26c, 26d thus able to move slidably in tandem within the slots 28. The tensioning feature 25 tends to maintain a tension upon the belt 8, the belt 8, in turn, due to the tension thereon, tending to bias the pairs of rollers 26a, 26b and 26c, 26d toward one another, as shown in FIG. 1, within the slots 28. The pairs of rollers 26a, 26b and 26c, 26d may also be biased additionally or via other mechanisms and/or methods towards one another, such as by use of springs connecting the end retainers 30, 31, or by use of hydraulic or other mechanisms engaged with the end retainers 30, 31 or rollers 26a, 26b, 26c, 26d.

The preforming machine 1 further comprises a pair of parallel wall portions 35, 36 or other mechanisms for supporting a variably appliable enhanced pressure, such as one or more inflatable bladders (see, e.g., inflatable bladders 35a, 36a best shown in FIGS. 2A-2D). In the exemplary embodiment shown in FIG. 1, wall portions 35, 36 are attached (e.g., via nuts and bolts or welds) to the housing 2 at each end of the wall portions 35, 36. In one exemplary embodiment, opposing inflatable bladders are attached to wall portions 35, 36, the bladders being inflatable via one or more valves 37.

Operation of the present invention in accordance with FIG. 1 occurs as follows. One or more plies along with an applied binder (e.g., hardener and resin material that "cure" so as to harden) are emplaced on a surface of the belt 8 facing the leading edge of the mandrel 4. Additional materials may also be included with the plies and binder, such as sensors, heater components, or other devices or materials to be embodied in the part to be made using the laminate formed. Optionally, a buffering layer (e.g., non-reactive plastic film) is overlayed the emplaced plies and binder. The mandrel 4 is then engaged with rack 6. A handle or other driving mechanism coupled to the pinion 7 (e.g., via shaft 20) is used to drive the pinion 7 rotationally so as to engage the gear mechanisms and thus the engagement features of the mandrel 4.

As the mandrel 4 engages the belt 8 by moving down, as shown in FIG. 1, upon being driven by the pinion 7 and engaging gear mechanisms, the pairs of rollers 26a, 26b and 26c, 26d tend to be driven apart from one another, as shown in FIG. 1, so as to allow the mandrel 4 to pass therebetween, past the rolling rollers. The tension in the belt 8, however, tends to continue to bias the pairs of rollers 26a, 26b and 26c, 26d toward one another, as shown in FIG. 1. Thus, the belt 8 passing about the rollers 26a, 26b, 26c, 26d tends to wrappably envelop the passing mandrel 4 and overlayed plies/binder, such that the surface of the mandrel 8 engages the surface of the belt 8 and plies/binder and a generally even pressure is thereby applied to the leading edge (i.e., lower edge as shown in FIG. 1) of the mandrel 8 and plies/binder.

One result of the uniform enveloping pressure of the belt 8 applied to the mandrel 4 and plies/binder is that the a generally uniform thickness of laminate is formed thereby at the portion of the laminate located at the leading edge of the mandrel 4 (i.e., bottom edge of mandrel 4, as shown in FIG. 1). Thus, for example, a very uniform fold in the plies/binder about the end of the mandrel 4 may be obtained, and smooth application of pressure from the belt 8 to the sides of the mandrel 4 and bulk of the plies/binder may be obtained.

Further, in one embodiment, one or more of the rollers 26a, 26b, 26c, 26d, belt 8, mandrel 4, and/or other parts of the preforming machine 1 are maintained at a generally uniform temperature (e.g., heated to a raised uniform temperature above ambient), so as to enhance "tackification" (e.g., stickiness and softening of the resin/hardener during the forming process within the preforming machine 1).

Once the mandrel 4 and plies/binder are enveloped within the belt 8 and have traveled to a position such that the engaged surfaces are located between the parallel wall portions 35, 36, at least one of the bladders or other enhanced pressure devices are engaged, such as by inflating the bladders to a predetermined air or fluid pressure, so as to apply generally uniform pressure to the plies/binder overlaying the sides of the mandrel 4. The pressure of the inflated bladders or other enhanced pressure devices is maintained for a predetermined period so as to set the plies/binder. For example, for some binder material, the time period may be about five minutes. By applying a generally uniform pressure via the bladders or other enhance pressure devices via the belt 8 along the side surfaces of the mandrel 4 and plies/binder, a uniform compression to produce a generally uniform thickness of plies/binder may be obtained.

The thickness of the plies/binder thus produced may be varied by varying the tension in the tensioning feature 25 (e.g., by varying the mass of the weight used), particularly with respect to the thickness at the leading edge of the mandrel 4, and by varying the amount of pressure and/or compression applied via the bladders or other enhanced pressure devices (for the portions of the plies/binder along the sides of the mandrel 4).

After the forming process is completed within the preforming machine 1, the plies/binder are typically removed and allowed to cure (e.g., the resin and hardener to cure), so as to form a generally rigid part.

FIGS. 2A-2D present representative side views of various stages of operation of the present invention, in accordance with the exemplary embodiment of FIG. 1.

Figure 2A:
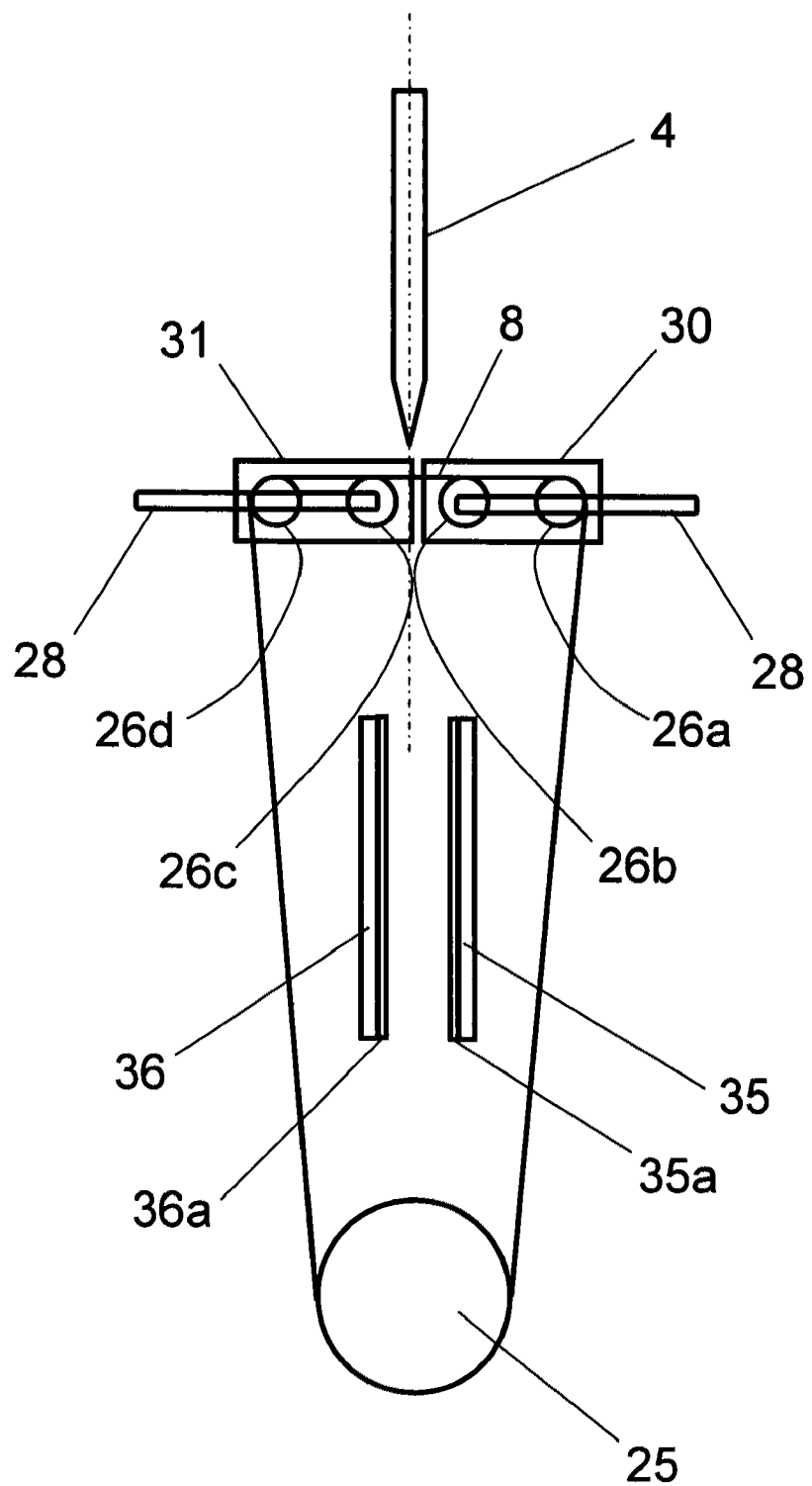
FIGS. 2A-2D present representative side views of various stages of operation of the present invention, in accordance with the exemplary embodiment of FIG. 1.

In FIG. 2A, the mandrel 4 is shown at a position prior to engagement with the belt 8 and plies/binder. Tensioning feature 25 places a tension on the belt 8. End retainers 30 and 31 and respective pairs of attached rollers 26a, 26b and 26c, 26d are drawn toward one another to a minimal separation distance another by virtue of tension on the belt 8. An axial direction of the mandrel is shown with a dashed line. The axial direction of the mandrel is shown as being generally perpendicular to the upper surface of the belt 8 wrapped over rollers 26a, 26b, 26c, and 26d. The material to be formed is placed on this upper surface.

Figure 2B:
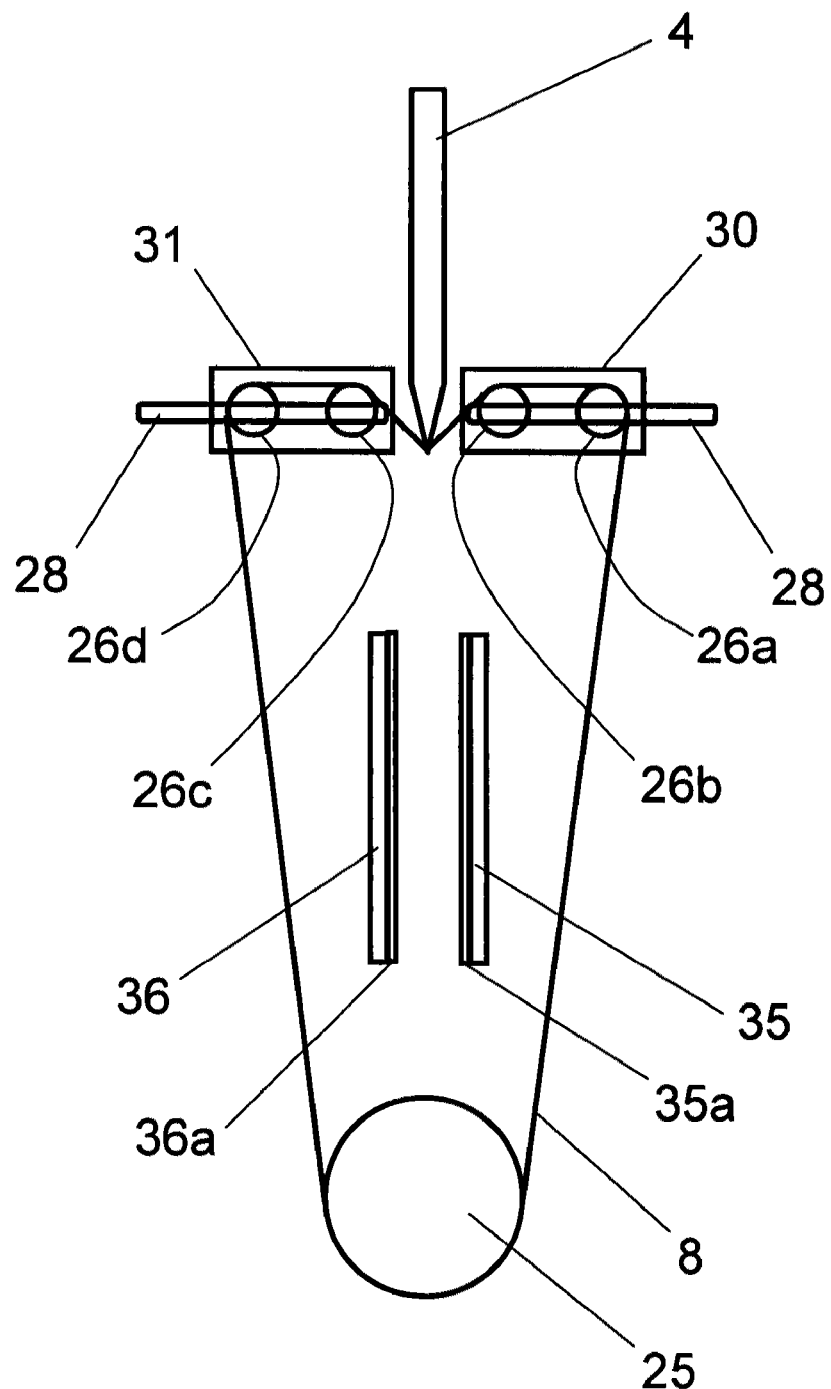

As shown in FIG. 2B, downward movement of the mandrel 4 and plies/binder have resulted in the mandrel 4 beginning to engage the belt 8 and plies/binder. End retainers 30 and 31 and respective pairs of attached rollers 26a, 26b and 26c, 26d have separated, as shown in FIG. 2B, due to impact of the mandrel 4 with the belt 8. Tensioning feature 25 has displaced upwardly slightly, as shown in FIG. 2B, in response to engagement of the mandrel 4 with the belt 8 and plies/binder.

Figure 2C:
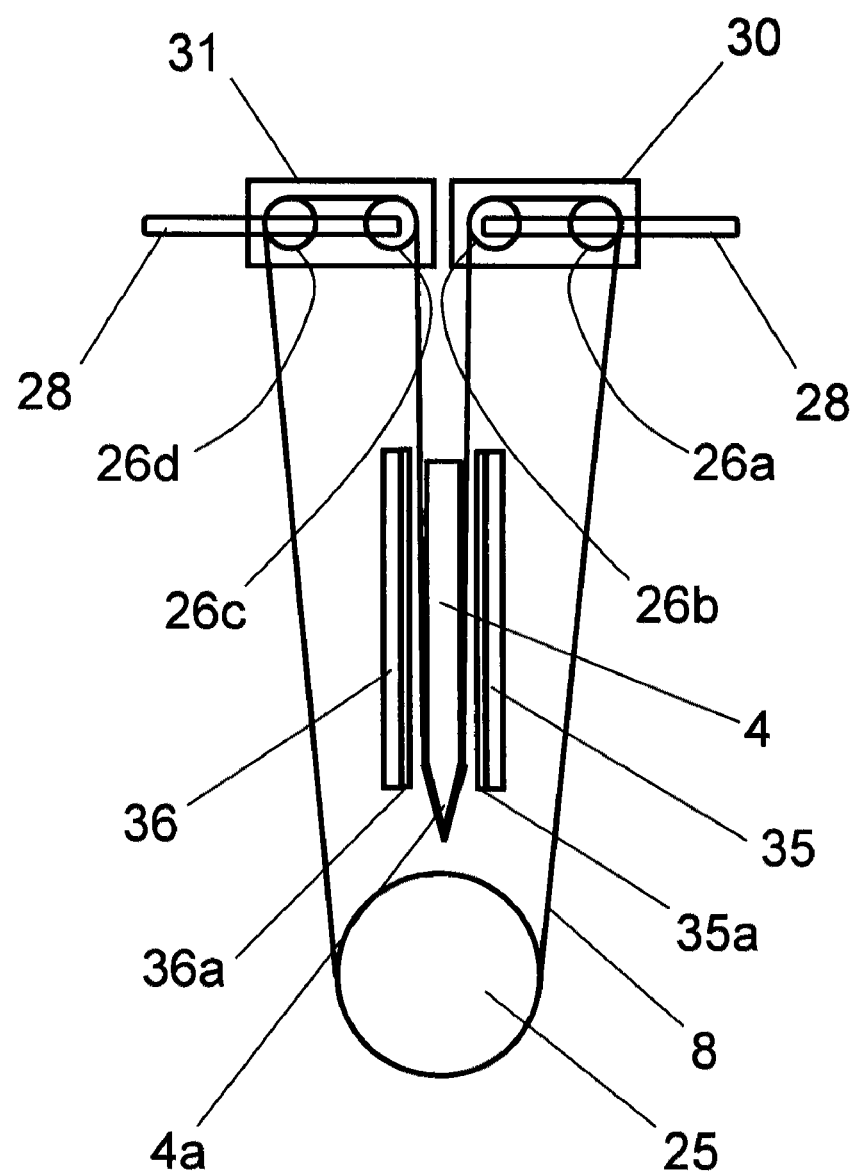

In FIG. 2C, the mandrel 4 and plies/binder have been moved to a position between the parallel wall portions 35, 36 and the corresponding mechanisms for supporting a variably appliable enhanced pressure 35a, 36a, such as one or more inflatable bladders. The belt 8 wraps around the leading edge 4a of the mandrel 4, so as to generally uniformly compress the portion of the plies/binder wrapped about mandrel 4 at the leading edge 4a. End retainers 30 and 31 and respective pairs of attached rollers 26a, 26b and 26c, 26d moved to a slightly lesser separation distance due to positioning of the mandrel 4 and plies/binder. Tensioning feature 25 has displaced upwardly to the position shown in FIG. 2B, in response to positioning of the mandrel 4 and engagement thereof with the belt 8 and plies/binder.

Figure 2D:
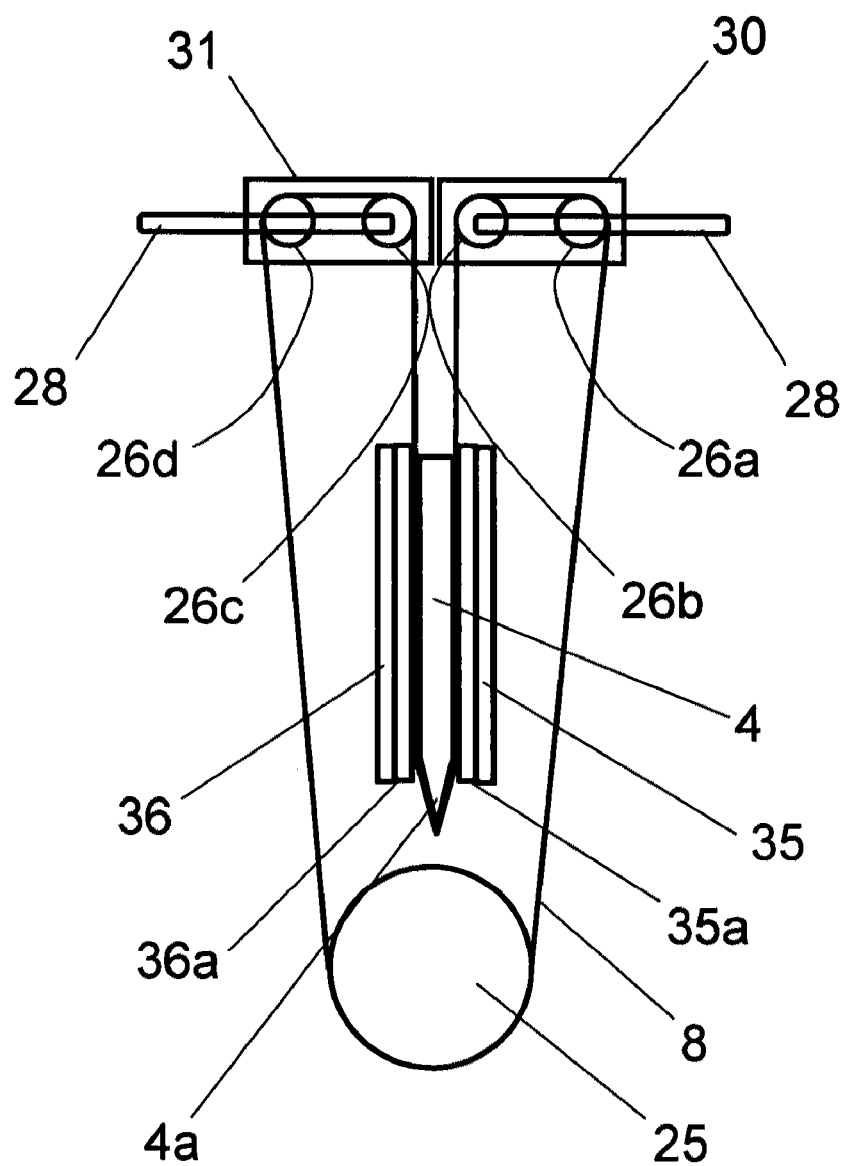

In FIG. 2D, the mandrel 4 and plies/binder remain in the position shown in FIG. 2C. The mechanisms for supporting a variably appliable enhanced pressure 35a, 36a, such as one or more inflatable bladders, have now been engaged (e.g., bladders inflated), so as to generally uniformly compress the portion of the plies/binder along the side edges of the mandrel 4. Thus, a generally uniform pressure is applied to the plies/binder at both the leading edge 4a and along the sides of the mandrel 4.

FIG. 3 shows an embodiment of a plurality of layers of material to be formed located on the surface of the belt facing the leading edge of the mandrel such that the layers have a surface generally perpendicular to the axial direction of the mandrel. However, the material to be formed may be only one layer of material with a binder. The material to be formed may include any number of layers of material with a binder. This material may be a composite material or a laminate.

Although exemplary embodiments of the present invention have now been discussed in accordance with the above advantages, it will be appreciated by one of ordinary skill in the art that these examples are merely illustrative of the invention and that numerous variations and/or modifications may be made without departing from the spirit or scope invention.

The invention claimed is:

1. A device for performing consolidation, the device comprising:
   a rack;
   at least two rollers, wherein the at least two rollers include a pair of extensions extending from ends of the rollers, and wherein the extensions are slidable in slots in retainers for the rollers;
   a belt surrounding the at least two rollers;
   a weight, wherein the belt serpentines around the at least two rollers and the weight, such that the at least two rollers are biased toward each other;
   an elongated mandrel having an elongation direction and engageable with the rack:
   a material to be consolidated being applied to a surface of the belt facing the leading edge of the mandrel; and
   a mandrel engaging mechanism;
   wherein the mandrel engaging mechanism is capable of driving the mandrel in a direction parallel to the elongation direction of the mandrel and generally perpendicularly to the surface of the belt with the applied material from a first position to second position;
   wherein two parallel wall portions are located on opposite sides of the mandrel when the mandrel is driven into the belt to the second position;
   wherein an inflatable bladder is located on at least one of the parallel wall portions; and
   wherein each inflatable bladder is capable of compressing against a side of the mandrel.

2. An apparatus for uniformly consolidating and orienting a material to be formed into a laminate, the apparatus comprising:
   at least two rollers spaced apart from one another;
   a belt extending across and supported by the at least two rollers;
   a tensioning feature placing a tension on the belt;
   a mandrel having an elongation direction, in which the mandrel is movable in a direction parallel to the elongation direction between a non-engaged position and an engaged position in which the mandrel engages the belt and the material disposed thereon and passes, at least in part, between the at least two rollers and the belt and the material moves with the mandrel between the non-engaged position and the engaged position; and
   at least one inflatable bladder so disposed as to apply a consolidation pressure to the belt to consolidate the material to be formed between the belt and the mandrel when the mandrel is in the engaged position.

3. The apparatus of claim 2, wherein the material is a composite material that forms the laminate.

4. The apparatus of claim 2, further comprising:
   a rack supporting and controlling movement of the mandrel between the non-engaged position and the engaged position; and
   a pinion that engages the mandrel to drive the mandrel into the belt.

5. The apparatus of claim 4, wherein the rack and pinion comprise teeth that engage the mandrel.

6. The apparatus of claim 2, further comprising:
   a mechanism for applying a variably enhanced pressure to the mandrel.

7. The apparatus of claim 6, wherein the mechanism for applying a variably enhanced pressure includes parallel wall portions located on opposite sides of the mandrel when the mandrel is driven into the belt and the variably enhanced pressure is applied in a direction perpendicular to the direction of movement of the mandrel.

8. The apparatus of claim 7, wherein the opposing parallel wall portions include the at least one inflatable bladder.

9. The apparatus of claim 2, wherein the tensioning feature includes at least one selected from a group consisting of a weight, a biasing mechanism, and an electromagnetically controlled roller.

10. The apparatus of claim 9, wherein the biasing mechanism is a spring.

11. The apparatus of claim 9, wherein the tensioning feature includes a cylindrical weight, and wherein the belt wraps around the cylindrical weight and the belt is an endless belt.

12. The apparatus of claim 2, wherein at least one of the rollers includes a pair of extensions extending from ends of the roller, and wherein the extensions are inserted slidably in slots in retainers for the rollers.

13. The apparatus of claim 12, further comprising:
    a biasing mechanism for biasing the at least two rollers toward each other.

14. The device of claim 1, wherein the elongated mandrel comprises a leading edge.

15. The apparatus of claim 2, wherein the elongated mandrel comprises a leading edge and the mandrel defines a non-cylindrical forming surface.

16. A device for forming an aircraft component from a composite material, the device comprising:
    a rack;
    at least two rollers, wherein the at least two rollers include a pair of extensions extending from ends of the rollers, and wherein the extensions are slidable in slots in retainers for the rollers;
    a belt surrounding the at least two rollers;
    a weight, wherein the belt serpentines around the at least two rollers and the weight, such that the at least two rollers are biased toward each other;
    an elongated mandrel having an elongation direction and engageable with the rack:
    a material of an aircraft component to be consolidated being applied to a surface of the belt facing the leading edge of the mandrel; and
    a mandrel engaging mechanism;
    wherein the mandrel engaging mechanism is capable of driving the mandrel in a direction parallel to the elongation direction of the mandrel and generally perpendicularly to the surface of the belt with the applied material from a first position to second position;
    wherein two parallel wall portions are located on opposite sides of the mandrel when the mandrel is driven into the belt to the second position;
    wherein an inflatable bladder is located on at least one of the parallel wall portions; and
    wherein each inflatable bladder is capable of compressing against a side of the mandrel.

17. The device of claim 16, wherein the composite material comprises two sheets of material bound by a binder.

* * * * *